(12) United States Patent  
Nojikawa

(10) Patent No.: US 8,261,641 B2  
(45) Date of Patent: Sep. 11, 2012

(54) SCREW AND DRIVER BIT

(76) Inventor: Terufumi Nojikawa, Fujimi (JP)

( * ) Notice: Subject to any disclaimer, the term of this patent is extended or adjusted under 35 U.S.C. 154(b) by 364 days.

(21) Appl. No.: 12/594,334

(22) PCT Filed: May 21, 2008

(86) PCT No.: PCT/JP2008/059308  
§ 371 (c)(1),  
(2), (4) Date: Oct. 1, 2009

(87) PCT Pub. No.: WO2009/001635  
PCT Pub. Date: Dec. 31, 2008

(65) Prior Publication Data  
US 2010/0104397 A1   Apr. 29, 2010

(30) Foreign Application Priority Data  
Jun. 27, 2007   (JP) ................. 2007-168378

(51) Int. Cl.  
*B25B 23/00* (2006.01)
(52) U.S. Cl. ............... 81/460; 81/125; 81/436
(58) Field of Classification Search .......... 81/125, 81/436, 460  
See application file for complete search history.

(56) References Cited

U.S. PATENT DOCUMENTS

| | | | | |
|---|---|---|---|---|
| 3,234,982 A | * | 2/1966 | Stillwagon, Jr. ............... | 81/460 |
| 6,378,406 B1 | * | 4/2002 | Totsu ............................ | 81/460 |

FOREIGN PATENT DOCUMENTS

| | | |
|---|---|---|
| JP | 56-14614 A | 2/1981 |
| JP | 11-311226 A | 11/1999 |
| JP | 2000-108043 A | 4/2000 |
| JP | 2000-230526 A | 8/2000 |
| JP | 2004-144250 A | 5/2004 |

* cited by examiner

*Primary Examiner* — Joseph J Hail  
*Assistant Examiner* — Shantese McDonald  
(74) *Attorney, Agent, or Firm* — Birch, Stewart, Kolasch & Birch, LLP

(57) ABSTRACT

Provided are a screw (11) which can significantly reduce the cam-out if a dedicated driver bit is (14) used, and which also allows the use of a driver (6) bit for a standard cross recess and can reduce the cam-out to some extent, and a dedicated driver bit (14) for such a screw (11).

Of a recess (13), a central portion (17) and proximal end side portions (18a) of blade engaging portions (18) are configured in the same manner as in a standard cross recess. The tightening side sidewall (20) or the loosening side sidewall (21) in the distal end side portions (18b) of blade engaging portions (18) are bent at an oblique angle. A dedicated driver bit has a corresponding cross-sectional configuration to that of the recess (13). Because the dedicated driver bit is hard to tilt relative to the screw (11) and the engagement between the blades (19) of the driver bit (14) and the blade engaging portions (18) is improved, the cam-out becomes hard to occur. A standard driver bit can also be used, because the central portion (17) and the proximal end side portions (18a) of four blade engaging portions (18) are similar to those of a standard cross recess.

18 Claims, 10 Drawing Sheets

SCREW AND DRIVER BIT

TECHNICAL FIELD

This invention relates to a screw and a driver bit, and more particularly to a screw having an improved recess for engaging with a driver bit that is generally depression-like and a driver bit therefor.

BACKGROUND ART

As a recess provided in a screw head, that is generally depression-like, H, Z and S shape cross recesses defined by JIS B 1012, or other types of cross recesses called Phillips or Posidrive type, etc. have been generally used (Of the cross recesses defined by JIS, the H shape falls under the category of the Phillips type, and the Z shape under that of the Posidrive type). FIG. 1 shows the H shape cross recess defined by JIS B 1012 as a representative of such typical conventional cross recesses.

As obvious from FIG. 1, the typical conventional cross recess 3 has a central portion 4, four blade engaging portions 5, which are portions for engaging with blades of a driver bit, extending outwardly from the central portion 4 at 90 degrees intervals. The four blade engaging portions 5 are extending in a straight line in the radial direction of the screw 1. A standard conventional driver bit 6 (see FIG. 7) for tightening or loosening the screw 1 with such a cross recess 3 has a shape complementary to the recess 3.

Because in the typical conventional cross recess 3, each of both sidewalls 7 and 8 of the blade engaging portions 5 makes a plane, even if the driver bit 6 is properly inserted into the cross recess 3 in axial alignment with the axis of the screw 1, the engagement between the blade engaging portions 5 and blades 9 of the driver bit 6 is not well. Therefore, when trying to turn the screw 1, the so-called cam-out phenomenon, in which the driver bit slips out of the cross recess 3, is likely to occur. Moreover, the driver bit 6 is liable to tilt relative to the screw 1, and such situation is apt to cause the cam-out phenomenon more and more.

Such being the situation, the present applicant previously proposed, in Patent Reference 1, as a screw with a recess that can eliminate such disadvantages of the typical conventional cross recess, a screw "comprising a recess that is generally depression-like and that has blade engaging portions for engaging with blades of a driver bit, wherein a distal portion of at least one of the sidewalls of each of the blade engaging portion bending from a proximal portion of the sidewall away from the opposite sidewall" and driver bit "wherein a distal portion of at least one of side-faces of each of blades bending from a proximal portion of the side-face away from the opposite side-face".

According to this screw proposed by the present applicant, because the distal portion of at least one of the sidewalls of each of the blade engaging portion bends from the proximal portion of the sidewall away from the opposite sidewall, if the driver bit with blades of a shape complementary to that of the blade engaging portions is used, upon tightening or loosening the screw, the driver bit is hard to tilt relative to the axis of the screw by virtue of the mating of the bent sidewalls of the blade engaging portions of the screw with the bent side-faces of the blades of the driver bit, and the sidewalls of the blade engaging portions bite into the side-faces of the blades, with the former having a shape bent according to the latter, ensuring that the side-faces securely grip the sidewalls and thereby the engagement between the blades and the blade engaging portions is improved. Consequently, the driver bit is hard to cam out of the recess.

Patent Reference 1: Japanese Laid-Open Patent Publication No. 2000-230526

DISCLOSURE OF INVENTION

Problems to be Solved by the Invention

However, as for the embodiments of the screw proposed by the present applicant, there is a problem that, if a standard driver bit for the typical conventional recess is used, screw tightening or loosening operations cannot be achieved appropriately, even in view of the prior art level.

The present invention has been made in view of such prior art situations and it is an object of the present invention to provide a screw which is very hard to cause the cam-out if a dedicated driver bit is used, and which can achieve screw tightening and loosening operations even using a standard driver bit for the typical cross recess and is less likely to cause the cam-out than a screw with the typical conventional recess, although not less as when a dedicated driver bit is used.

It is another object of the present invention to provide a driver bit which is very hard to cause the cam-out when used for a screw according to the present invention.

The other objects of the present invention will become apparent from the following detailed description.

Means for Solving Problem

A screw in accordance with a first invention of the present application comprises: a recess for engaging with a driver bit, the recess being generally depression-like, each of the blade engaging portions comprising a proximal end side portion extending outwardly in the radial direction of the screw and a distal end side portion extending further outwardly from the proximal end side portion, the proximal end side portions of the blade engaging portions being arranged at equal angular intervals, each of the blade engaging portions having a tightening side sidewall and a loosening side sidewall, the tightening side sidewall being a sidewall to exist in front of a blade of the driver bit when tightening the screw and the loosening side sidewall being a sidewall opposite to the tightening side sidewall to exist in front of the blade of the driver bit when loosening the screw, in each of the blade engaging portions, the tightening side sidewall in the distal end side portion bending at an oblique angle from the tightening side sidewall in the proximal end side portion away from the loosening side sidewall, the central portion having biting portions between the proximal end side portions of the four blade engaging portions, each of the biting portions having an inner wall protruding toward the axis of the screw and being inclined inwardly so that the deeper in the central portion, the narrower the central portion becomes.

A driver bit in accordance with a first invention of the present application is one for engaging with a recess of a screw, the recess being generally depression-like and having a central portion and four blade engaging portions extending outwardly from the central portion, wherein the driver bit comprising a bit central portion and four blades for engaging the blade engaging portions of the screw, the blades extending outwardly from the bit central portion, each of the blades comprising a proximal end side portion extending outwardly in the radial direction of the driver bit and a distal end side portion extending further outwardly from the proximal end side portion, the proximal end side portions of the blades being arranged at equal angular intervals, each of the blades having a tightening side side-face and a loosening side side-face, the tightening side side-face making the front side-face in the rotating direction of the driver bit when tightening the screw and the loosening side side-face making the front side-face in the rotating direction of the driver bit when loosening the screw, in each of the blades, the tightening side side-face in the distal end side portion bending at an oblique angle from the tightening side side-face in the proximal end side portion away from the loosening side side-face, the bit central portion having bit side biting portions between the proximal end side portions of the four blades, each of the bit side biting portions having an outer wall recessed outwardly and being inclined inwardly so that at the more distal portion in the bit axial direction, the smaller the bit central portion becomes.

In the case of the screw of the first invention, because in each of the blade engaging portions, the tightening side sidewall in the distal end side portion bends at an oblique angle from the tightening side sidewall in the proximal end side portion away from the loosening side sidewall, if the driver bit of the first invention with blades of a shape complementary to that of the blade engaging portions is used, upon tightening the screw, the driver bit is hard to tilt relative to the axis of the screw by virtue of the mating of the bent tightening side sidewalls of the screw with the bent tightening side side-faces of the driver bit, and the tightening side sidewalls of the blade engaging portions bite into the tightening side side-faces of the blades, with the former having a shape bent according to the latter, ensuring that the side-faces securely grip the sidewalls and thereby the engagement between the blades and the blade engaging portions is improved. Consequently, the cam-out is hard to occur. Therefore, upon tightening the screw, torque can be transmitted without fail and the screw is securely tightened.

On the other hand, as in the typical conventional recess, the recess of the present invention has a central portion and four blade engaging portions extending outwardly from the central portion; each of the blade engaging portions comprises a proximal end side portion extending outwardly in the radial direction of the screw, the proximal end side portions being arranged at equal angular intervals; and the central portion has biting portions between the proximal end side portions of the four blade engaging portions; and each of the biting portions having an inner wall protruding toward the axis of the screw and being inclined inwardly so that the deeper in the central portion, the narrower the central portion becomes. Therefore, screw tightening and loosening operations can be achieved even using a standard driver bit for the typical cross recess with appropriate size but not using a dedicated driver bit (the driver bit of the first invention).

In this case, because the tightening side side-face of each blade of the standard driver bit is not bending, the advantage that the cam-out is hard to occur cannot be obtained to the fullest extent as when the dedicated driver bit is used. However, the cam-out is less likely to occur than with typical conventional cross recessed screws for the reasons discussed hereinafter, although not less as when a dedicated driver bit is used.

In the case of typical conventional cross recessed screws, the blades of the driver bit and the blade engaging portions of the screw actually tend not to contact effectively with each other, causing a situation where only the bit-side biting portions of the driver bit and the biting portions of the cross recess of the screw are in contact with each other, which often leads to the cam-out. However, when the screw of the first invention is driven in the tightening direction by the standard driver bit, because the tightening side side-faces of the blades of the driver bit and the far end of the tightening side sidewall in the proximal end side portion of the blade engaging portions of the screw contact most strongly each other, positioning major contact points between the screw and the driver bit outer than the biting portions, the cam-out is less likely to occur than in the case of the typical conventional cross recessed screw, though not so less as when a dedicated driver is used.

In the screw of the second invention, in each of the blade engaging portions, the loosening side sidewall in the distal end side portion bends at an oblique angle from the loosening side sidewall in the proximal end side portion away from the tightening side sidewall.

In the driver bit of the second invention corresponding to the screw of the second invention, in each of the blades, the loosening side side-face in the distal end side portion bends at an oblique angle from the loosening side side-face in the proximal end side portion away from the tightening side side-face.

In the case of the screw of the second invention, because in each of the blade engaging portions, the loosening side sidewall in the distal end side portion bends at an oblique angle from the loosening side sidewall in the proximal end side portion away from the tightening side sidewall, if the driver bit of the second invention with blades of a shape complementary to that of the blade engaging portions is used, upon loosening the screw, the driver bit is hard to tilt relative to the axis of the screw by virtue of the mating of the bent loosening side sidewalls of the screw with the bent loosening side side-faces of the driver bit, and the loosening side sidewalls of the blade engaging portions bite into the loosening side side-faces of the blades, with the former having a shape bent according to the latter, ensuring that the side-faces securely grip the sidewalls and thereby the engagement between the blades and the blade engaging portions is improved. Consequently, the cam-out is hard to occur. Therefore, upon loosening the screw, torque can be transmitted without fail and the screw is securely loosened.

Also in this case, as is the case with the typical conventional cross recess, the recess of the present invention has a central portion and four blade engaging portions extending outwardly from the central portion; each of the blade engaging portions comprises a proximal end side portion extending outwardly in the radial direction of the screw, the proximal end side portions being arranged at equal angular intervals; and the central portion has biting portions between the proximal end side portions of the four blade engaging portions, each of the biting portions having an inner wall protruding toward the axis of the screw and being inclined inwardly so that the deeper in the central portion, the narrower the central portion becomes. Therefore, screw tightening and loosening operations can be achieved even using a standard driver bit for the typical cross recess with appropriate size.

In this case also, because the loosening side side-face of each blade of the standard driver bit is not bending, the advantage that the cam-out is hard to occur cannot be obtained to the fullest extent as when the dedicated driver bit (the driver bit of the second invention) is used. However, when the screw of the second invention is driven in the loosening direction by the standard driver bit, because the loosening side side-faces of the blades of the driver bit and the far end of the loosening side sidewall in the proximal end side portion of the blade engaging portions of the screw contact most strongly each other, positioning major contact points between the screw and the driver bit outer than the biting portions, the cam-out is less likely to occur than in the case of the typical conventional cross recessed screw, though not so less as when a dedicated driver is used.

TECHNICAL ADVANTAGE OF THE INVENTION

The screw in accordance with the present invention provides excellent advantages such that, when a dedicated driver bit is used, the cam-out is very hard to occur, and even when a standard driver bit for the typical cross recess with appropriate size is used, screw tightening and loosening operations can be achieved, and moreover, the cam-out is less likely to occur than in the case of the typical conventional cross recessed screw, though not so less as when a dedicated driver is used.

The driver bit in accordance with the present invention provides excellent advantages such that, when a screw in accordance with the present invention is driven by it, the cam-out is very hard to occur.

Figure 1:
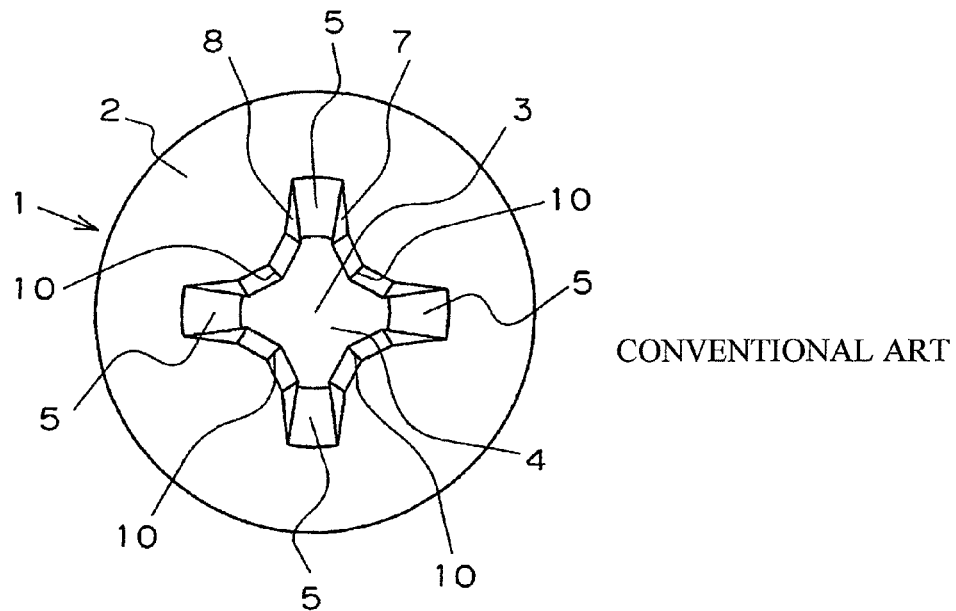
FIG. 1 is a plan view of a typical conventional cross recessed screw.

EXPLANATION OF LETTERS OR NUMERALS 1 typical conventional cross recessed screw
2 head
3 typical conventional cross recess
4 central portion
5 blade engaging portion
6 standard conventional driver bit for the typical cross recess
7, 8 sidewall of blade engaging portion
9 blade
10 biting portion of the typical conventional cross recess
11 screw
12 head
13 recess
14 dedicated driver bit
15 shank
16 thread
17 central portion
18 blade engaging portion
18a proximal end side portion of blade engaging portion
18b distal end side portion of blade engaging portion
19 blade
19a proximal end side portion of blade
19b distal end side portion of blade
20 tightening side sidewall
20a tightening side sidewall in the proximal end side portion ("tightening side sidewall in proximal end side portion")
20b tightening side sidewall in the distal end side portion ("tightening side sidewall in distal end side portion")
21 loosening side sidewall
21a loosening side sidewall in the proximal end side portion ("loosening side sidewall in proximal end side portion")
21b loosening side sidewall in the distal end side portion ("loosening side sidewall in distal end side portion")
22 inner wall of biting portion
22a, 22b planar portion of inner wall
22c central portion of inner wall
23 biting portion
24 bit central portion
25 tightening side side-face
25a tightening side side-face in the proximal end side portion ("tightening side side-face in proximal end side portion")
25b tightening side side-face in the distal end side portion ("tightening side side-face in distal end side portion")
26 loosening side side-face
26a loosening side side-face in the proximal end side portion ("loosening side side-face in proximal end side portion")
26b loosening side side-face in the distal end side portion ("loosening side side-face in distal end side portion")
27 outer wall of bit side biting portion
28 bit side biting portion
29 tightening side side-face of a standard driver bit
30 loosening side side-face of a standard driver bit
31 outer wall of bit side biting portion of a standard driver bit
32 bit side biting portion of a standard driver bit

BEST MODE FOR CARRYING OUT THE INVENTION

Embodiments of the present invention will now be described hereunder with reference to the accompanying drawings.

Embodiment 1

Figure 2:
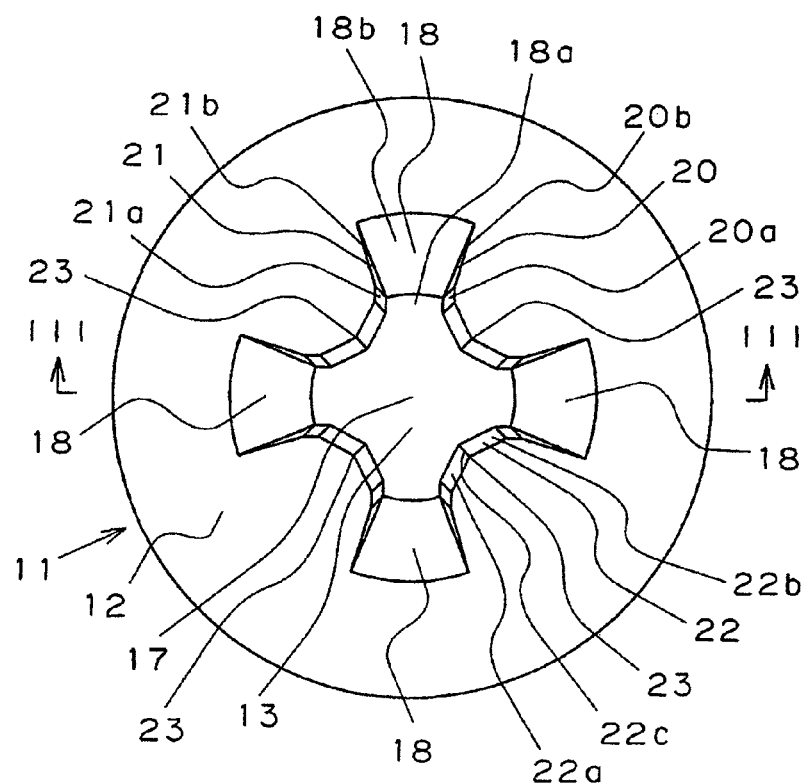
FIG. 2 is a plan view of a screw in Embodiment 1 of the present invention.
Figure 3:
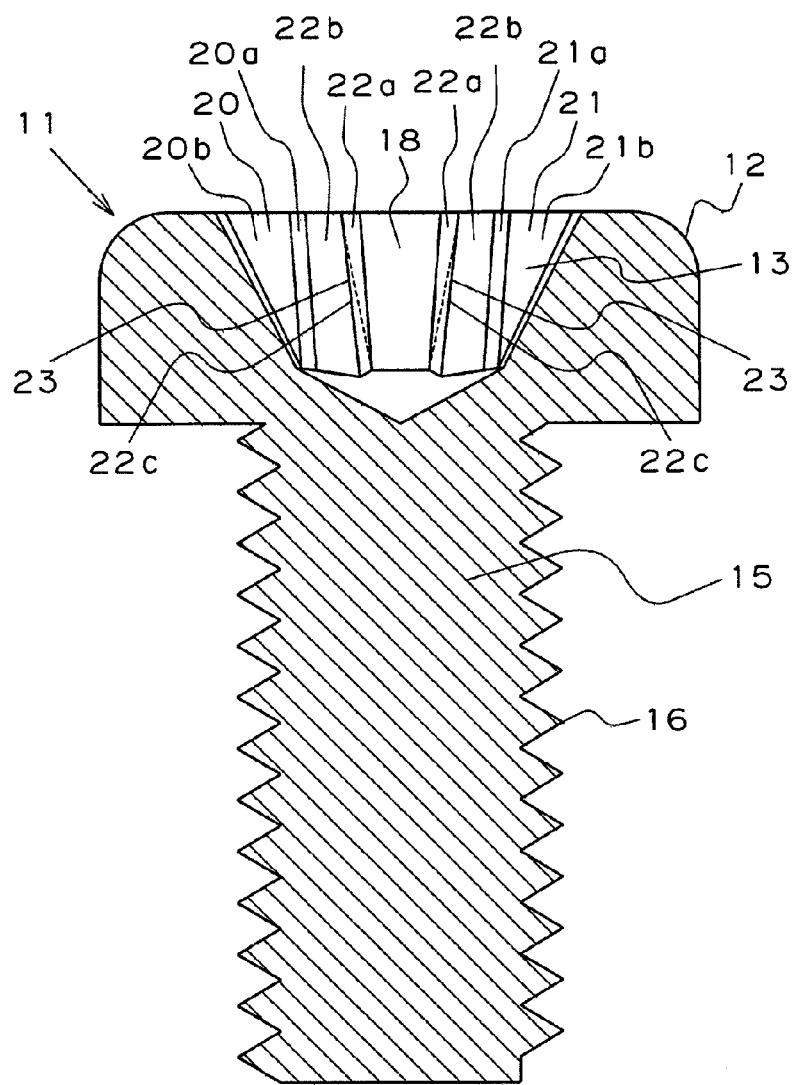
FIG. 3 is a cross sectional view taken along the line III-III of FIG. 2.
Figure 4:
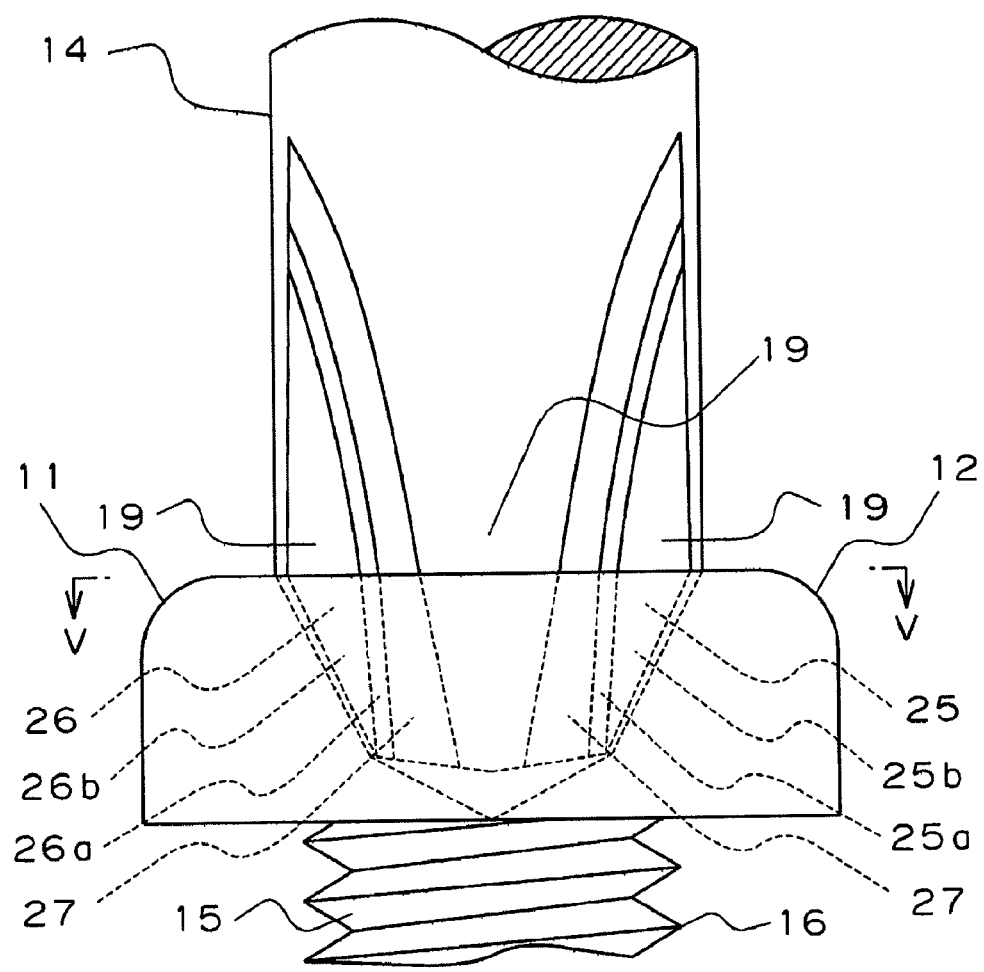
FIG. 4 is a side view showing the screw with a dedicated driver bit engaging with its recess in Embodiment 1.
Figure 5:
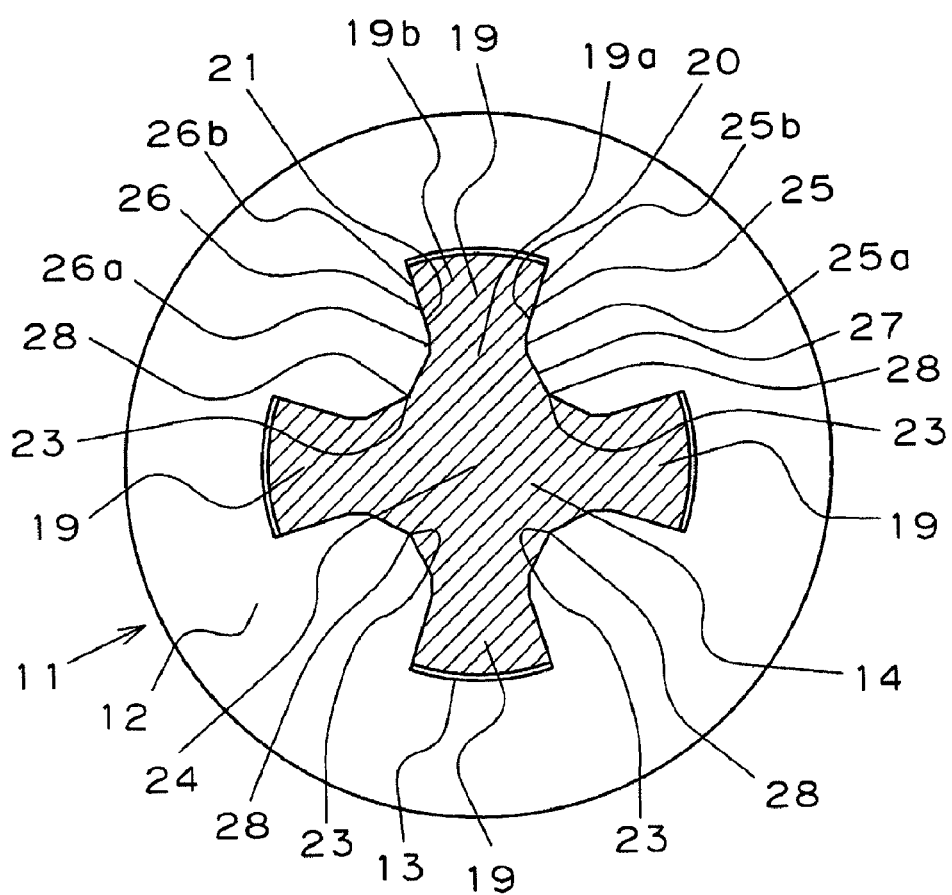
FIG. 5 is a cross sectional view taken along the line V-V of FIG. 4.
Figure 6:
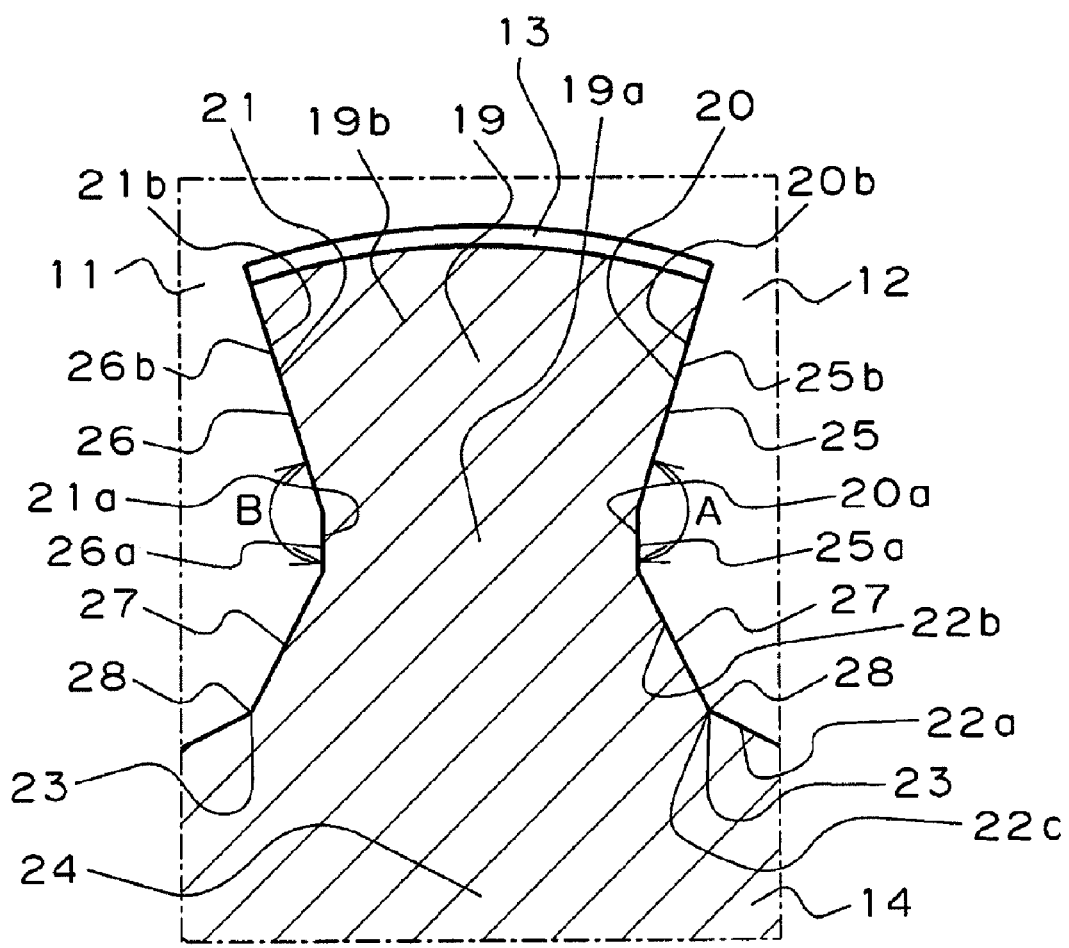
FIG. 6 is a partial enlarged cross sectional view of FIG. 5.

FIGS. 2 through 8 show Embodiment 1 of the present invention. Of these figures, FIG. 2 is a plan view of a screw 11 (a view showing the screw 11 in the axial direction from the head 12 thereof), FIG. 3 is a cross sectional view taken along the line III-III of FIG. 2, FIG. 4 is a side view showing a recess 13 of the screw 11 with a dedicated driver bit 14 that will be explained in detail later engaging therewith, FIG. 5 is a cross sectional view taken along the line V-V of FIG. 4, and FIG. 6 is a partial enlarged cross sectional view of FIG. 5.

As shown in FIG. 3, a right-hand screw thread 16 is formed on a shank 15 of a screw 11. In a head 12 of the screw 11 a depression-like recess 13 is formed by depressing a part of the head 12. As shown in FIG. 2, the recess 13 is generally cruciform in shape having a central portion 17 and four blade engaging portions 18 extending outwardly from the central portion 17. Each of the blade engaging portions 18 comprises a proximal end side portion 18a extending outwardly in the radial direction of the screw 11 and a distal end side portion 18b extending further outwardly from the proximal end 18a. The proximal end side portions 18a of the blade engaging portions 18 are arranged at equal angular intervals, namely 90 degrees intervals. Each of the blade engaging portions 18 has a tightening side sidewall 20 that is a sidewall to exist in front of a blade 19 (see FIG. 5) of the driver bit 14 when tightening the screw 11 and a loosening side sidewall 21 that is a sidewall opposite to the tightening side sidewall 20 to exist in front of the blade 19 of the driver bit 14 when loosening the screw 11.

In each of the blade engaging portions 18, the tightening side sidewall 20 in the proximal end side portion 18*a* (hereinafter referred to as "tightening side sidewall in proximal end side portion" 20*a*) is planar and inclined inwardly so that the deeper in the blade engaging portion 18, the narrower the proximal end side portion 18*a* becomes. The tightening side sidewall 20 in the distal end side portion 18*b* (hereinafter referred to as "tightening side sidewall in distal end side portion" 20*b*) is also planar and inclined inwardly so that the deeper in the blade engaging portion 18, the narrower the distal end side portion 18*b* becomes. In each of the blade engaging portions 18, the "tightening side sidewall in distal end side portion" 20*b* bends at an oblique angle from the "tightening side sidewall in proximal end side portion" 20*a* away from the loosening side sidewall 21. In each of the blade engaging portions 18, the angle A (see FIG. 6) between the "tightening side sidewall in proximal end side portion" 20*a* and the "tightening side sidewall in distal end side portion" 20*b* is preferably 155 to 177 degrees, and more preferably 160 to 170 degrees.

In each of the blade engaging portions 18, the loosening side sidewall 21 in the proximal end side portion 18*a* (hereinafter referred to as "loosening side sidewall in proximal end side portion" 21*a*) is planar and inclined inwardly so that the deeper in the blade engaging portion 18, the narrower the proximal end side portion 18*a* becomes. The loosening side sidewall 21 in the distal end side portion 18*b* (hereinafter referred to as "loosening side sidewall in distal end side portion" 21*b*) is also planar and inclined inwardly so that the deeper in the blade engaging portion 18, the narrower the distal end side portion 18*b* becomes. In each of the blade engaging portions 18, the "loosening side sidewall in distal end side portion" 21*b* bends at an oblique angle from the "loosening side sidewall in proximal end side portion" 21*a* away from the tightening side sidewall 20. In each of the blade engaging portions 18, the angle B (see FIG. 6) between the "loosening side sidewall in proximal end side portion" 21*a* and the "loosening side sidewall in distal end side portion" 21*b* is preferably 155 to 177 degrees, and more preferably 160 to 170 degrees.

The central portion 17 has four biting portions 23 between the proximal end side portions 18*a* of the four blade engaging portions 18. Each of the biting portions 23 has an inner wall 22 protruding toward the axis of the screw 11 and being inclined inwardly so that the deeper in the central portion 17, the narrower the central portion 17 becomes. The inner walls 22 of these biting portions 23, as in the type H cross recess specified by JIS B 1012, comprise pairs of planar portions 22*a* and 22*b* that form a certain angle with each other, and central portions 22*c* where the planar portions 22*a* and 22*b* meet each other form bent portions.

Here, as is the case with the typical conventional cross recess, the biting portions 23 are portions for bringing themselves and the corresponding parts of the dedicated driver bit 14 or the standard driver bit 6 for the typical cross recess (bit side biting portions 28 or 32 which will be discussed later) into intimate contact with each other to bite each other, causing the screw 11 stick to the driver bit 14 or 6, when the dedicated driver bit 14 or 6 is inserted into the recess 13 of the screw 11.

In the recess 13, the central portion 17 and the proximal end side portion 18*a* of each blade engaging portion 18, constructed as stated above, have basically similar shapes and sizes as the corresponding portions of the type H cross recess specified by JIS B 1012.

As shown in FIGS. 4 to 6, the dedicated driver bit 14 has a corresponding cross-sectional configuration to that of the recess 13. To describe more fully, the driver bit 14 has, on the axially distal end side thereof, a bit central portion 24 and four blades 19 extending outwardly from the bit central portion 24. Each of the blades 19 comprises a proximal end side portion 19*a* extending outwardly in the radial direction of the bit 14 and a distal end side portion 19*b* extending further outwardly from the proximal end 19*a*. The proximal end side portions 19*a* of the blades 19 are arranged at equal angular intervals, namely, at 90 degrees intervals. Each of the blades 19 has a tightening side side-face 25 which makes the front side-face in the rotating direction of the driver bit 14 when tightening screws and a loosening side side-face 26, opposite to the tightening side side-face 25, which makes the front side-face in the rotating direction of the driver bit 14 when loosening screws.

In each of the blades 19, the tightening side side-face 25 in the proximal end side portion 19*a* (hereinafter referred to as "tightening side side-face in proximal end side portion" 25*a*) is planar and inclined inwardly so that at the more distal portion in the bit axial direction, the thinner the proximal end side portion 19*a* becomes. This inclination angle is the same as that of the "tightening side sidewall in proximal end side portion" 20*a* of the blade engaging portion 18. The tightening side side-face 25 in the distal end side portion 19*b* (hereinafter referred to as "tightening side side-face in distal end side portion" 25*b*) is also planar and inclined inwardly so that at the more distal portion in the bit axial direction, the thinner the distal end side portion 19*b* becomes. This inclination angle is the same as that of the "tightening side sidewall in distal end side portion" 20*b* of the blade engaging portion 18. In each of the blades 19, the "tightening side side-face in distal end side portion" 25*b* bends at an oblique angle from the "tightening side side-face in proximal end side portion" 25*a* away from the loosening side side-face 26. The angle between "tightening side side-face in proximal end side portion" 25*a* and the "tightening side side-face in distal end side portion" 25*b* is the same as the angle A between the "tightening side sidewall in proximal end side portion" 20*a* and the "tightening side sidewall in distal end side portion" 20*b*.

In each of the blades 19, the loosening side side-face 26 in the proximal end side portion 19*a* (hereinafter referred to as "loosening side side-face in proximal end side portion" 26*a*) is planar and inclined inwardly so that at the more distal portion in the bit axial direction, the thinner the proximal end side portion 19*a* becomes. This inclination angle is the same as that of the "loosening side sidewall in proximal end side portion" 21*a* of the blade engaging portion 18. The loosening side side-face 26 in the distal end side portion 19*b* (hereinafter referred to as "loosening side side-face in distal end side portion" 26*b* is also planar and inclined inwardly so that at the more distal portion in the bit axial direction, the thinner the distal end side portion 19*b* becomes. This inclination angle is the same as that of the "loosening side sidewall in distal end side portion" 21*b* of the blade engaging portion 18. In each of the blades 19, the "loosening side side-face in proximal end side portion" 26*b* bends at an oblique angle from the "loosening side side-face in proximal end side portion" 26*a* away from the tightening side side-face 25. The angle between "loosening side side-face in proximal end side portion" 26*a* and the "loosening side side-face in proximal end side portion" 26*b* is the same as the angle B between the "loosening side sidewall in distal end side portion" 21*a* and the "loosening side sidewall in distal end side portion" 21*b*.

The bit central portion 24 has bit side biting portions 28 between the proximal end side portions 19*a* of the four blades 19. Each of the bit side biting portions 28 has an outer wall which is recessed outwardly and inclined inwardly so that at the more distal portion in the bit axial direction, the smaller the bit central portion 24 becomes.

Now, the operation of this embodiment will be described. Because in each of the blade engaging portions 18, the "tightening side sidewall in distal end side portion" 20*b* bends at an oblique angle from the "tightening side sidewall in proximal end side portion" 20*a* away from the loosening side sidewall 21, if the dedicated driver bit 14 with blades 19 having the complementary shape is used, as shown in FIGS. 4 to 6, upon tightening the screw 11, the driver bit 14 is hard to tilt relative to the screw 11 by virtue of the mating of the bent tightening side sidewalls 20 of the screw 11 with the bent tightening side side-faces 25 of the driver bit 14, and the tightening side sidewalls 20 of the blade engaging portions 18 bite into the tightening side side-faces 25 of the blades 19, with the former having a shape bent according to the latter, ensuring that the tightening side-faces 25 securely grip the tightening sidewalls 20 and the engagement between the blades 19 and the blade engaging portions 18 is improved. Consequently, the cam-out is hard to occur. Therefore, upon tightening the screw 11, torque can be transmitted without fail and the screw 11 is securely tightened.

Likewise, because in each of the blade engaging portions 18, the "loosening side sidewall in distal end side portion" 21*b* bends at an oblique angle from "loosening side sidewall in proximal end side portion" 21*a* away from the tightening side sidewall 20, if the dedicated driver bit 14 with blades 19 having the complementary shape is used, upon loosening the screw 11, the driver bit 14 is hard to tilt relative to the axis of the screw 11 by virtue of the mating of the bent loosening side sidewalls 21 of the screw 11 with the bent loosening side side-faces 26 of the driver bit 14, and the loosening side sidewalls 21 of the blade engaging portions 18 bite into the loosening side side-faces 26 of the blades 19, with the former having a shape bent according to the latter, ensuring that the side-faces 26 securely grip the sidewalls 21 and the engagement between the blades 19 and the blade engaging portions 18 is improved. Consequently, the cam-out is hard to occur. Therefore, upon loosening the screw 11, torque can be transmitted without fail and the screw 11 is securely loosened.

Close contact between the biting portions 23 and the bit side biting portions 28 of the dedicated driver bit 14 provides a good biting as in the case that the standard driver bit 6 is used for the typical conventional screw.

As previously stated, the angle A between the "tightening side sidewall in proximal end side portion" 20*a* and the "tightening side sidewall in distal end side portion" 20*b* and the angle B between the "loosening side sidewall in proximal end side portion" 21*a* and the "loosening side sidewall in distal end side portion" 21*b*, respectively, is preferably 155 to 177 degrees, and more preferably 160 to 170 degrees (and so are the bending angle of the tightening side side-face 25 and that of the loosening side side-face 26 of the driver bit 14). When these angles are too small, since between the "tightening side sidewall in distal end side portion" 20*b* and the "tightening side side-face in distal end side portion" 25*b*, and between the "loosening side sidewall in distal end side portion" 21*b* and the "loosening side side-face in distal end side portion" 26*b*, the force components parallel to the walls and the side-faces become large, while the force components vertical to the walls and side-faces become small, the force transmissions between the walls and the side-faces do not take place well. Conversely, when the angles are too large, the working and effects by bending of the tightening side sidewall 20 and the loosening side sidewall 21 are less obtained.

On the other hand, the recess 13 of the screw 11 of the present invention, as in the typical conventional cross recess 3, has the central portion 17 and the four blade engaging portions 18 extending outwardly from the central portion 17; each of the blade engaging portions 18 has the proximal end side portion 18*a* extending outwardly in the radial direction of the screw 11, the proximal end side portions 18*a* being arranged at equal angular intervals; the central portion 17 has four biting portions 23 between the proximal end side portions 18*a* of the four blade engaging portions 18; and each of the biting portions 23 has an inner wall 22 protruding toward the axis of the screw 11 and being inclined inwardly so that the deeper in the central portion 17, the narrower the central portion 17 becomes. Therefore, screw tightening and loosening operations can be achieved even using a standard driver bit 6 for the typical cross recess with appropriate size, as shown in FIG. 7, but not using a dedicated driver bit 14.

Figure 7:
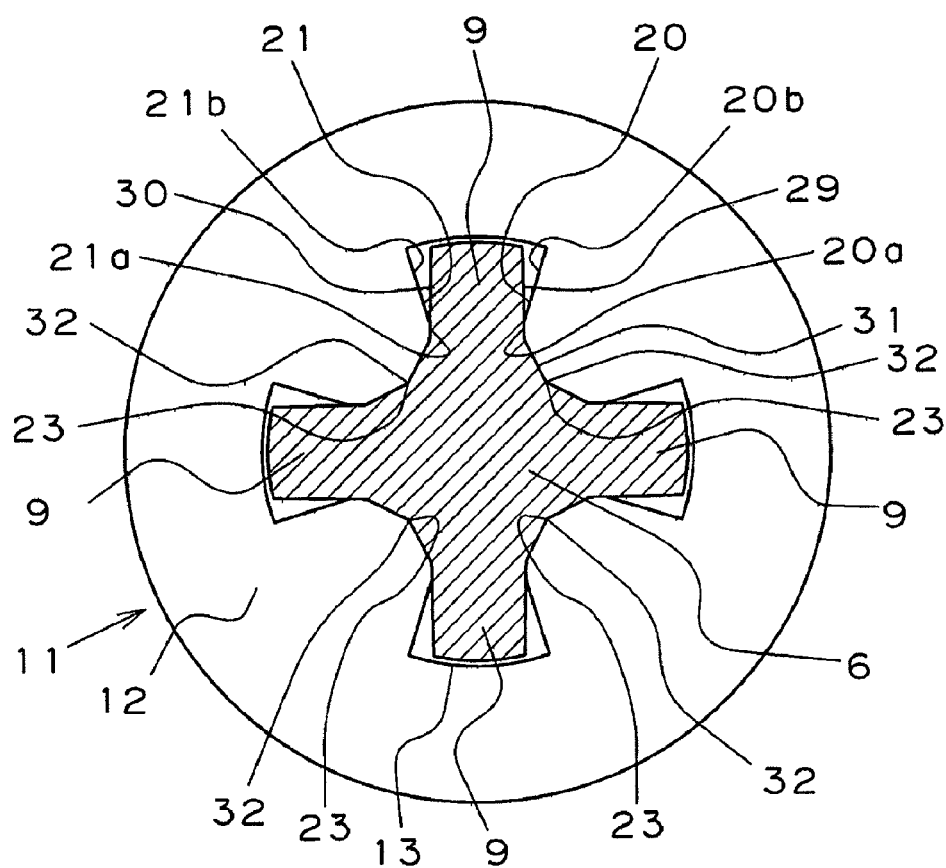
FIG. 7 is a cross sectional view showing the screw in Embodiment 1 with a standard driver bit engaging therewith.
Figure 8:
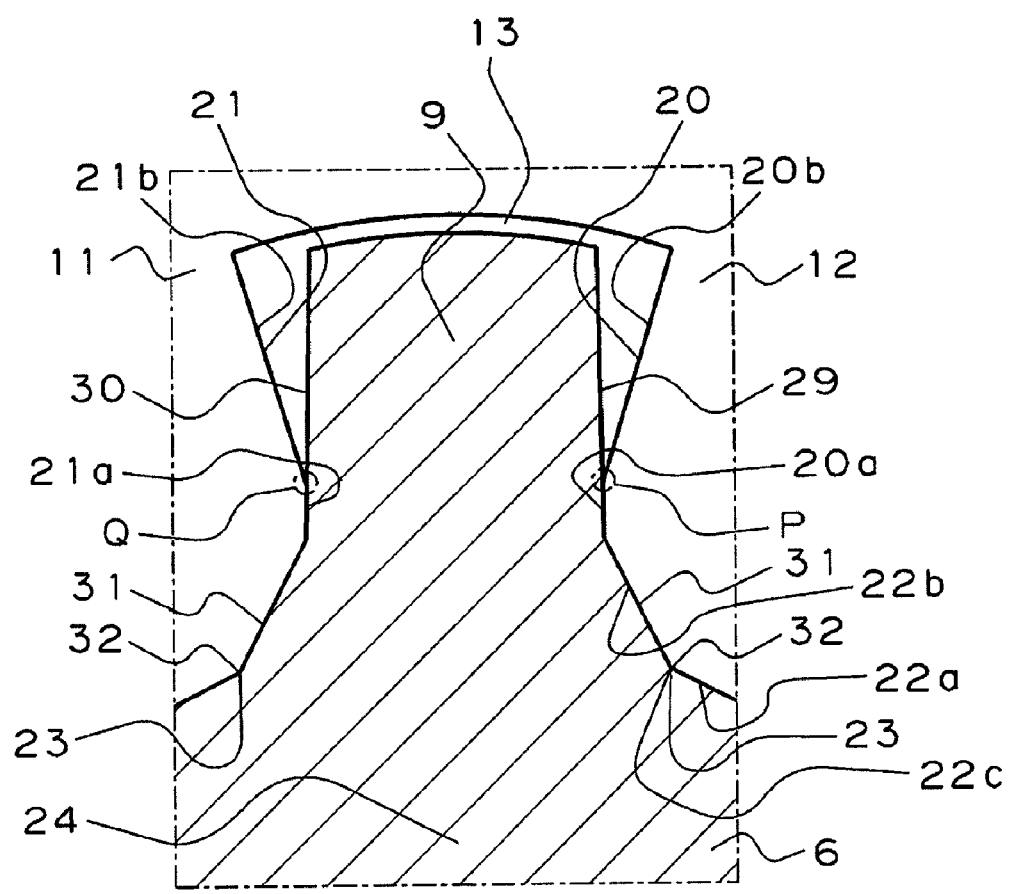
FIG. 8 is a partial enlarged cross sectional view of FIG. 7.

In FIG. 7, reference numeral 32 denotes bit side biting portions of the standard driver bit 6 and reference numeral 31 denotes their outer walls. Close contact between the bit side biting portions 32 and the biting portions 23 of the screw 11 provides a good biting as in the case that the standard driver bit 6 is used for the typical conventional cross recessed screw 1.

In the case like this, when the screw 11 is tightened and loosened by using the standard driver bit 6, the advantage that the cam-out is hard to occur cannot be obtained to the fullest extent as when the dedicated driver bit 14 is used, because the tightening side side-face 29 and the loosening side side-face 30 of each blade 9 of the standard driver bit 6 are not bending. However, for the reasons discussed hereinafter, the cam-out is less likely to occur than with the typical conventional recessed screw 1, although not less as when the dedicated driver bit 14 is used.

In the case of the typical conventional cross recessed screw 1, the blades 9 of the driver bit 6 and the blade engaging portions 5 of the screw 1 actually tend not to contact effectively with each other, causing a situation where only the bit-side biting portions 32 of the driver bit 6 and the biting portions 10 of the cross recess 3 of the screw 1 are in contact with each other, which often leads to the cam-out. However, when the screw 11 is driven in the tightening direction (in the loosening direction) by the standard driver bit 6, because, as shown encircled by a small circle in an alternate short and long dashed line in FIG. 8, the tightening side side-faces 29 (loosening side side-face 30) of the blades 9 of the driver bit 6 and the far end of the "tightening side sidewall in proximal end side portion" 20*a* ("loosening side sidewall in proximal end side portion" 21*a*) of the blade engaging portions 18 of the screw 11 contact most strongly each other, positioning major contact points between the screw 11 and the driver bit 6 outer than the biting portions 23, the cam-out is less likely to occur both when tightening and loosening the screw than in the case of the typical conventional cross recessed screw 1, though not so less as when the dedicated driver 14 is used.

Embodiment 2

Figure 9:
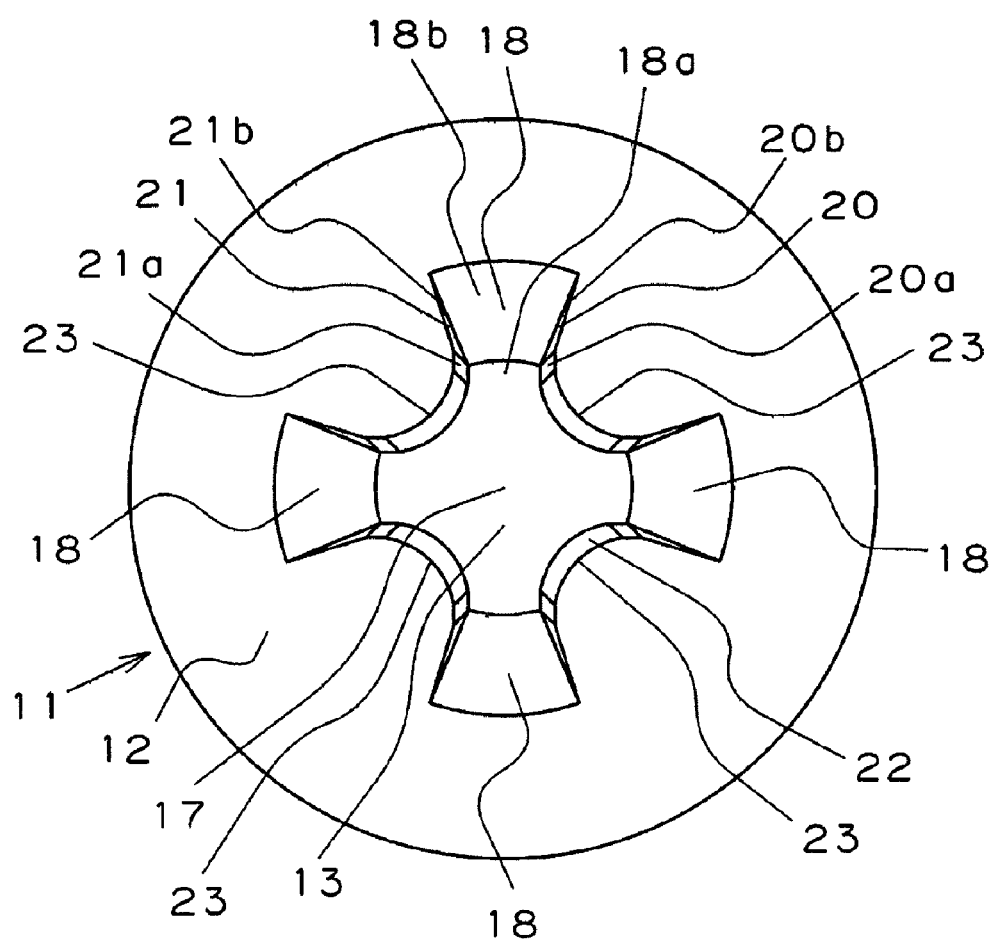
FIG. 9 is a plan view of a screw in Embodiment 2 of the present invention.
Figure 10:
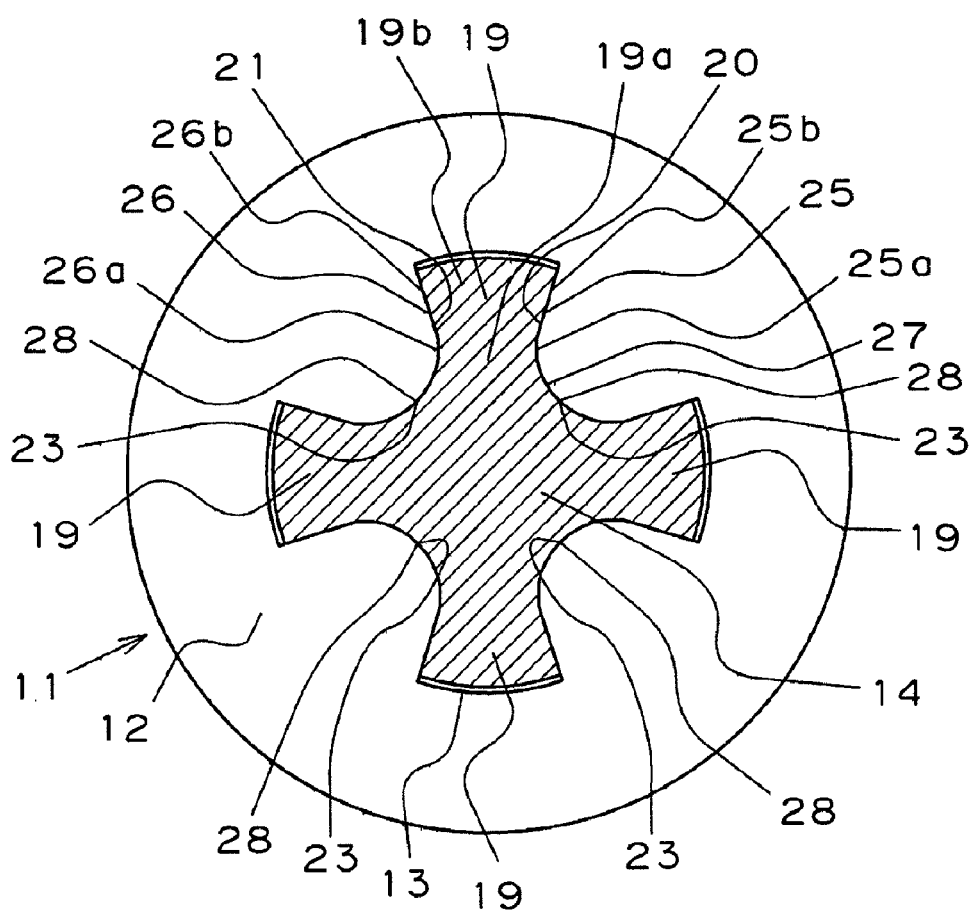
FIG. 10 is a cross sectional view showing a recess of the screw with a dedicated driver bit engaging therewith in Embodiment 2.
Figure 11:
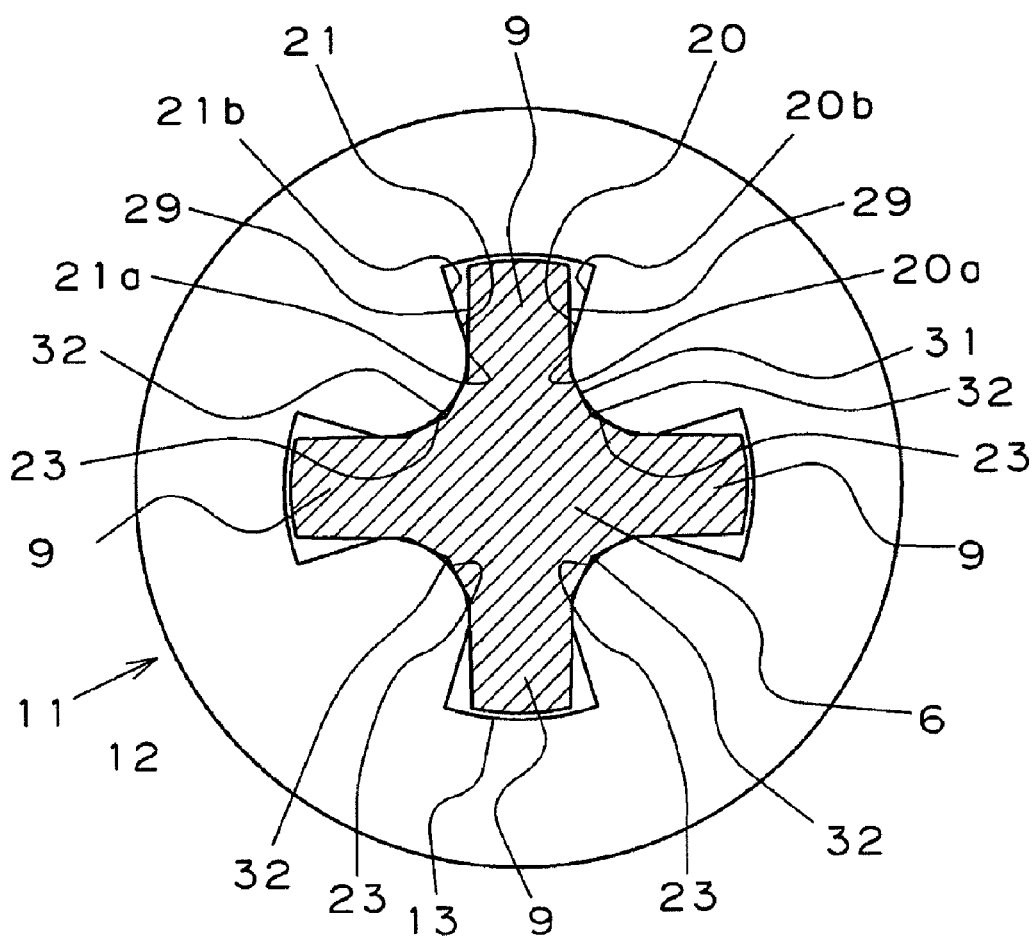
FIG. 11 is a cross sectional view showing the screw in Embodiment 2 with a standard driver bit engaging therewith.

FIGS. 9 through 11 show Embodiment 2 of the present invention. Unlike Embodiment 1 and the type H cross recess specified by JIS B 1012, in this embodiment, the inner walls 22 of four biting portions 23 are an arcuate face and do not have a bent portion in the central portion thereof. The configurations of the screw 11 and dedicated driver bit 14 are otherwise similar to Embodiment 1.

This embodiment also provides working and effects similar to those of Embodiment 1.

In each of the embodiments, both first and second present inventions of screws are applied to the one screw 11, and both first and second present inventions of driver bits are applied to the one driver bit 14; and thereby both the tightening and loosening side sidewalls 20 and 21 of the blade engaging portions 18 of the screw 11 and both the tightening and loosening side side-faces 25 and 26 of the blade 19 of the driver bit 14 are bent, respectively. But when there is not much need to prevent the cam-out either when tightening or loosening the screw, either the tightening or loosening side sidewalls 20 or 21 of the blade engaging portions 18 of the screw 11 and either the tightening or loosening side side-faces 25 or 26 of the blades 19 of the driver bit 14 may not need to be bent.

Although in each of the embodiments, the central portion 17 and the proximal end side portions 18a of blade engaging portions 18 of the screw recess 13 are basically formed to be similar in shape and size to those of the type H cross recess specified by JIS B 1012 to allow the standard driver for the type H cross recess to be used, in the present invention, the central portion and the proximal end side portions of blade engaging portions of the screw recess are basically formed to be similar in shape and size to those of any other typical recesses such as any other Phillips type, Posidrive type, or the type Z or S cross recess specified by JIS B 1012 to allow the standard driver for these recesses to be used.

Although in each of the embodiments, the "tightening side sidewalls in proximal end side portions" 20a, the "tightening side sidewalls in distal end side portions" 20b, the "loosening side sidewalls in proximal end side portions" 21a and the "loosening side sidewalls in distal end side portions" 21b of the screw 11 and the "tightening side side-faces in proximal end side portions" 25a, the "tightening side side-faces in distal end side portions" 25b, the "loosening side side-faces in proximal end side portions" 26a and the "loosening side side-faces in distal end side portions" 26b of the driver bit 14 are respectively inclined against the axis of the screw 11, in the present invention these walls or faces may not be inclined against but be parallel to the axis of the screw 11, respectively. In that case, the cam-out is even harder to occur.

Although in each of the embodiments, the "tightening side sidewalls in proximal end side portions" 20a, the "tightening side sidewalls in distal end side portions" 20b, the "loosening side sidewalls in proximal end side portions" 21a and the "loosening side sidewalls in distal end side portions" 21b of the screw 11 and the "tightening side side-faces in proximal end side portions" 25a, the "tightening side side-faces in distal end side portions" 25b, the "loosening side side-faces in proximal end side portions" 26a and the "loosening side side-faces in distal end side portions" 26b of the driver bit 14 are planar, respectively, in the present invention these walls or faces may not be planar but curved, respectively.

Industrial Applicability

As described above, the screw and the driver bit in accordance with the present invention are useful as a screw having a recess that is generally depression-like and a driver bit for driving such a screw.

The invention claimed is:

1. A screw comprising a recess for engaging with a driver bit, said recess being generally depression-like,
    said recess comprising a central portion and four blade engaging portions extending outwardly from said central portion,
    each of said blade engaging portions comprising a proximal end side portion extending outwardly in the radial direction of said screw and a distal end side portion extending further outwardly from said proximal end side portion,
    said proximal end side portions of said blade engaging portions being arranged at equal angular intervals,
    each of said blade engaging portions having a tightening side sidewall and a loosening side sidewall, said tightening side sidewall being a sidewall to exist in front of a blade of said driver bit when tightening said screw and said loosening side sidewall being a sidewall opposite to said tightening side sidewall to exist in front of said blade of said driver bit when loosening said screw,
    in each of said blade engaging portions, said tightening side sidewall in said distal end side portion bending at an oblique angle from said tightening side sidewall in said proximal end side portion away from said loosening side sidewall,
    said central portion having biting portions between said proximal end side portions of said four blade engaging portions,
    each of said biting portions having an inner wall protruding toward the axis of said screw and being inclined inwardly so that the deeper in said central portion, the narrower said central portion becomes.

2. A screw as set forth in claim 1, wherein, in each of said blade engaging portions, said tightening side sidewall in said proximal end side portion and said tightening side sidewall in said distal end side portion form an angle of 155 to 177 degrees with each other.

3. A screw as set forth in claim 1 or 2, wherein, in each of said blade engaging portions, said tightening side sidewall in said proximal end side portion is inclined inwardly so that the deeper in said blade engaging portion, the narrower said proximal end side portion becomes.

4. A screw as set forth in claim 1, wherein, in each of said blade engaging portions, said tightening side sidewall in said distal end side portion is inclined inwardly so that the deeper in said blade engaging portion, the narrower said distal end side portion becomes.

5. A screw as set forth in claim 1, wherein, in each of said blade engaging portions, said tightening side sidewall in said proximal end side portion is planar.

6. A screw as set forth in claim 1, wherein, in each of said blade engaging portions, said tightening side sidewall in said distal end side portion is planar.

7. A screw as set forth in claim 1, wherein, in each of said blade engaging portions, said loosening side sidewall in said distal end side portion bending at an oblique angle from said loosening side sidewall in said proximal end side portion away from said tightening side sidewall.

8. The screw of claim 1, wherein in each of the blade engaging portions, the tightening side sidewall in the distal end side portion is disposed on a different plane from that of the tightening side sidewall in the proximal end side portion, and the tightening side sidewall in the proximal end side portion is disposed on a different plane from the biting portion adjacent thereto.

9. The screw of claim 1, wherein in each of the blade engaging portions, the loosening side sidewall in the distal end side portion is disposed in a different plane from that of the loosening side sidewall in the proximal end side portion, and the loosening side sidewall in the proximal end side portion is disposed on a different plane from the biting portion adjacent thereto.

10. A screw comprising a recess for engaging with a driver bit, said recess being generally depression-like, said recess comprising a central portion and four blade engaging portions extending outwardly from said central portion, each of said blade engaging portions comprising a proximal end side portion extending outwardly in the radial direction of said screw and a distal end side portion extending further outwardly from said proximal end side portion, said proximal end side portions of said blade engaging portions being arranged at equal angular intervals, each of said blade engaging portions having a tightening side sidewall and a loosening side sidewall, said tightening side sidewall being a sidewall to exist in front of a blade of said driver bit when tightening said screw and said loosening side sidewall being a sidewall opposite to said tightening side sidewall to exist in front of said blade of said driver bit when loosening said screw, in each of said blade engaging portions, said loosening side sidewall in said distal end side portion bending at an oblique angle from said loosening side sidewall in said proximal end side portion away from said tightening side sidewall, said central portion having biting portions between said proximal end side portions of said four blade engaging portions, each of said biting portions having an inner wall protruding toward the axis of said screw and being inclined inwardly so that the deeper in said central portion, the narrower said central portion becomes.

11. A driver bit for engaging with a recess of a screw, said recess being generally depression-like and having a central portion and four blade engaging portions extending outwardly from said central portion, said driver bit comprising a bit central portion and four blades for engaging said blade engaging portions of said screw, said blades extending outwardly from said bit central portion, each of said blades comprising a proximal end side portion extending outwardly in the radial direction of said driver bit and a distal end side portion extending further outwardly from said proximal end side portion, said proximal end side portions of said blades being arranged at equal angular intervals, each of said blades having a tightening side side-face and a loosening side side-face, said tightening side side-face making the front side-face in the rotating direction of said driver bit when tightening said screw and said loosening side side-face making the front side-face in the rotating direction of said driver bit when loosening said screw, in each of said blades, said tightening side side-face in said distal end side portion bending at an oblique angle from said tightening side side-face in said proximal end side portion away from said loosening side side-face, said bit central portion having bit side biting portions between said proximal end side portions of said four blades, each of said bit side biting portions having an outer wall recessed outwardly and being inclined inwardly so that at the more distal portion in said bit axial direction, the smaller said bit central portion becomes.

12. A driver bit as set forth in claim 11, wherein, in each of said blades, said tightening side side-face in said proximal end side portion and said tightening side side-face in said distal end side portion form an angle of 155 to 177 degrees with each other.

13. A driver bit as set forth in claim 11 or 12, wherein, in each of said blades, said tightening side side-face in said proximal end side portion is inclined inwardly so that at the more distal portion in said bit axial direction, the thinner said proximal end side portion becomes.

14. A driver bit as set forth in claim 11, wherein, in each of said blades, said tightening side side-face in said distal end side portion is inclined inwardly so that at the more distal portion in said bit axial direction, the thinner said distal end side portion becomes.

15. A driver bit as set forth in claim 11, wherein, in each of said blades, said tightening side side-face in said proximal end side portion is planar.

16. A driver bit as set forth in claim 11, wherein, in each of said blades, said tightening side side-face in said distal end side portion is planar.

17. A driver bit as set forth in claim 11, wherein, in each of said blades, said loosening side side-face in said distal end side portion bending at an oblique angle from said loosening side side-face in said proximal end side portion away from said tightening side side-face.

18. A driver bit for engaging with a recess of a screw, said recess being generally depression-like and having a central portion and four blade engaging portions extending outwardly from said central portion, said driver bit comprising a bit central portion and four blades for engaging said blade engaging portions of said screw, said blades extending outwardly from said bit central portion, each of said blades comprising a proximal end side portion extending outwardly in the radial direction of said bit and a distal end side portion extending further outwardly from said proximal end side portion, said proximal end side portions of said blades being arranged at equal angular intervals, each of said blades having a tightening side side-face and a loosening side side-face, said tightening side side-face making the front side-face in the rotating direction of said driver bit when tightening said screw and said loosening side side-face making the front side-face in the rotating direction of said driver bit when loosening said screw, in each of said blades, said loosening side side-face in said distal end side portion bending at an oblique angle from said loosening side side-face in said proximal end side portion away from said tightening side side-face, said bit central portion having bit side biting portions between said proximal end side portions of said four blades, each of said bit side biting portions having an outer wall recessed outwardly and being inclined inwardly so that at the more distal portion in said bit axial direction, the smaller said bit central portion becomes.

* * * * *